Nov. 26, 1968

H. TORWEGGE 3,412,768

DEVICE FOR MACHINING THE LONGITUDINAL EDGES OF
PLATE-SHAPED WORKPIECES OF
DIFFERENT WIDTHS

Filed Dec. 29, 1965

Inventor:
HELMUT TORWEGGE
BY
Lowry & Rinehart
ATTYS.

Inventor:
HELMUT TORWEGGE

Nov. 26, 1968    H. TORWEGGE    3,412,768
DEVICE FOR MACHINING THE LONGITUDINAL EDGES OF
PLATE-SHAPED WORKPIECES OF
DIFFERENT WIDTHS
Filed Dec. 29, 1965    7 Sheets-Sheet 3

Inventor:
HELMUT TORWEGGE
BY
Lowry & Rinehart
ATTYS.

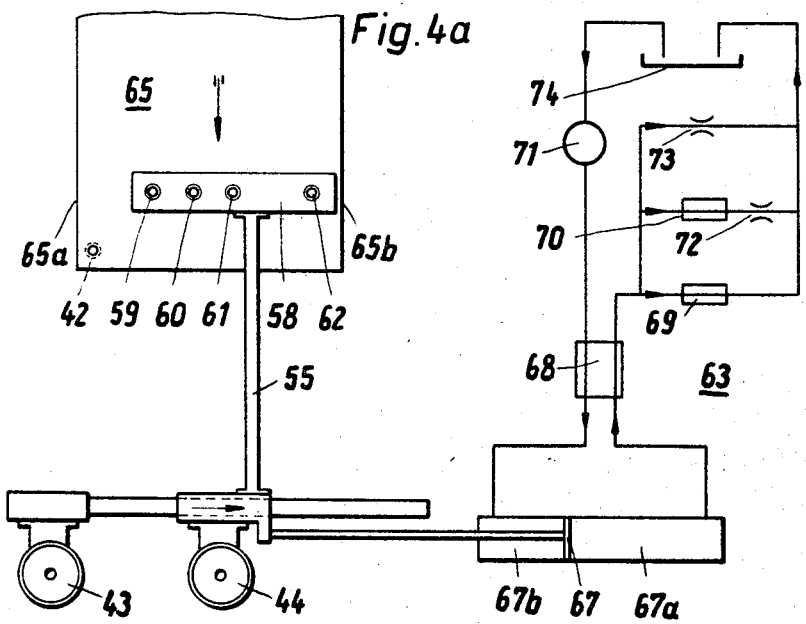
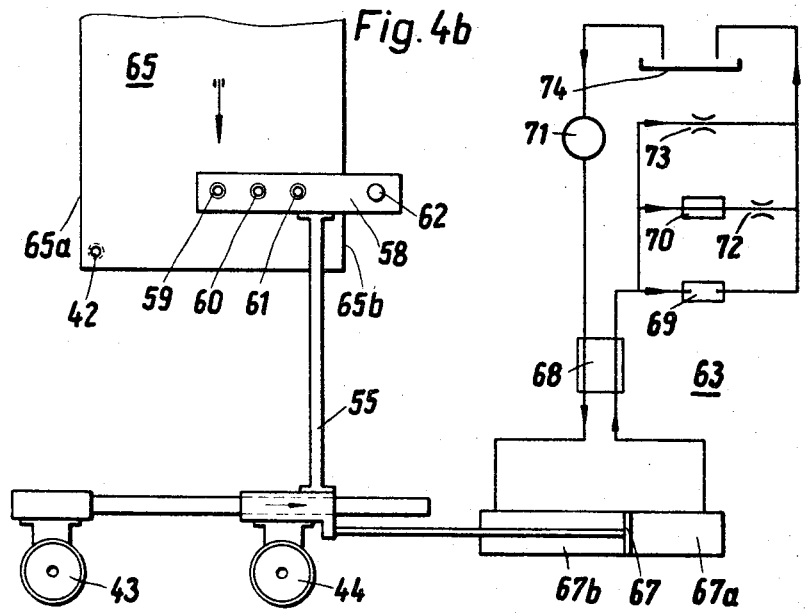

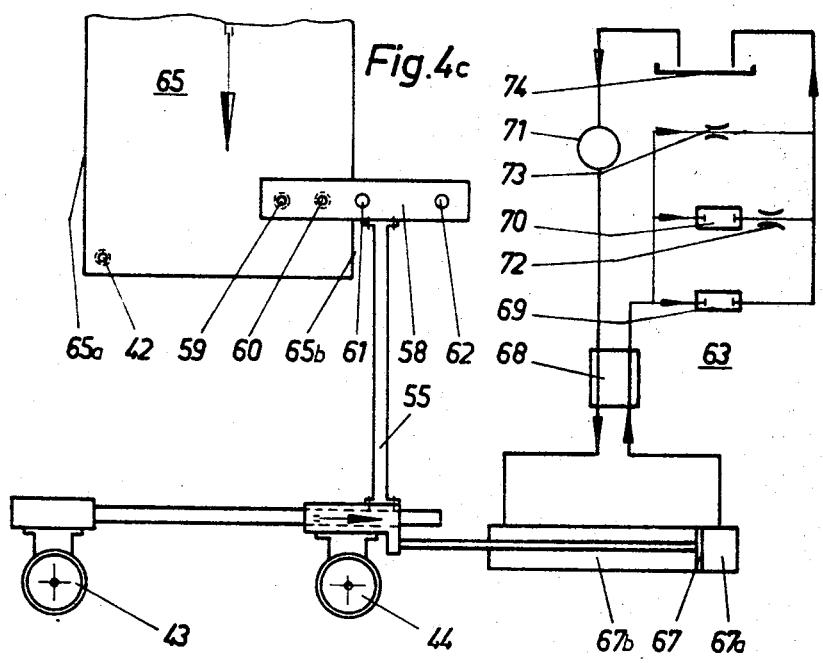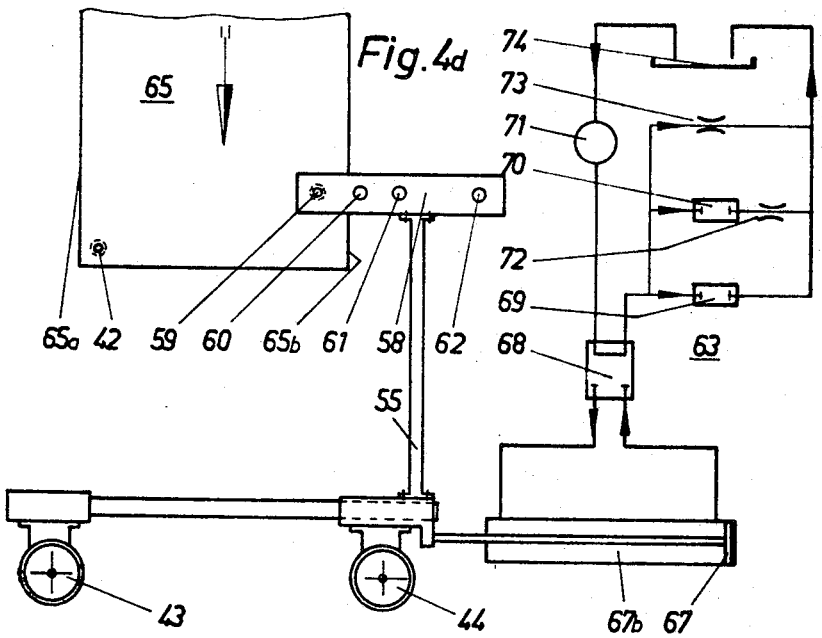

Nov. 26, 1968  H. TORWEGGE  3,412,768
DEVICE FOR MACHINING THE LONGITUDINAL EDGES OF
PLATE-SHAPED WORKPIECES OF
DIFFERENT WIDTHS
Filed Dec. 29, 1965  7 Sheets-Sheet 6
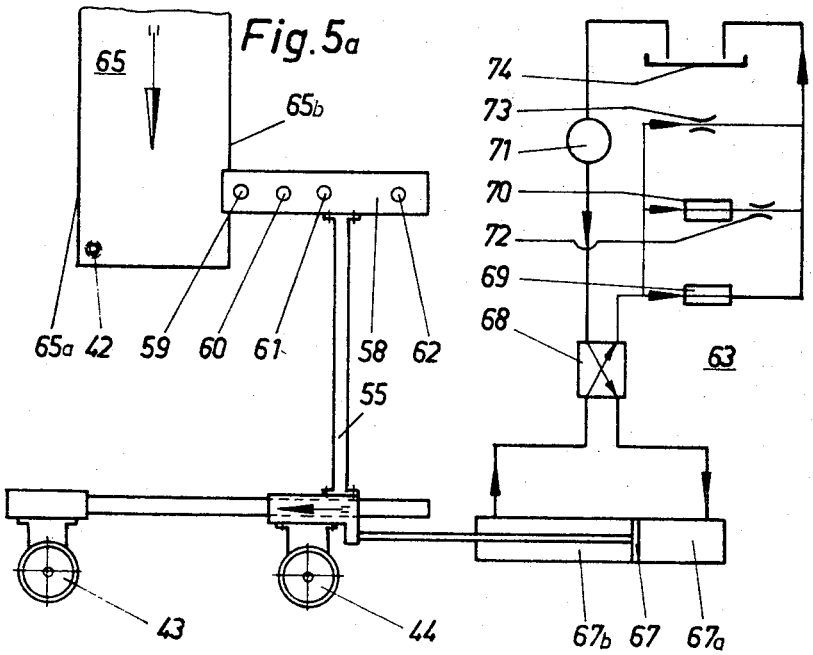
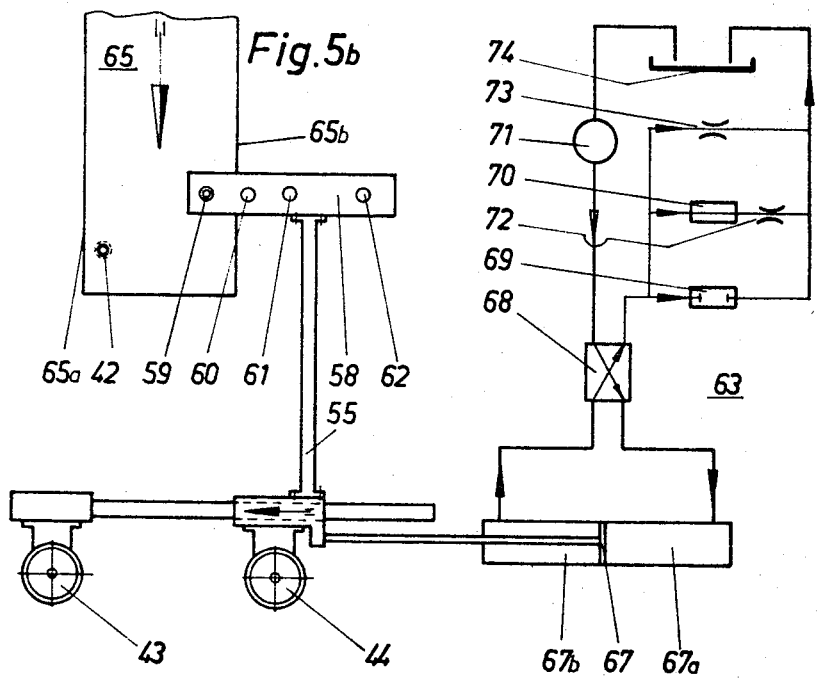
Inventor:
HELMUT TORWEGGE
Lowry & Rinehart

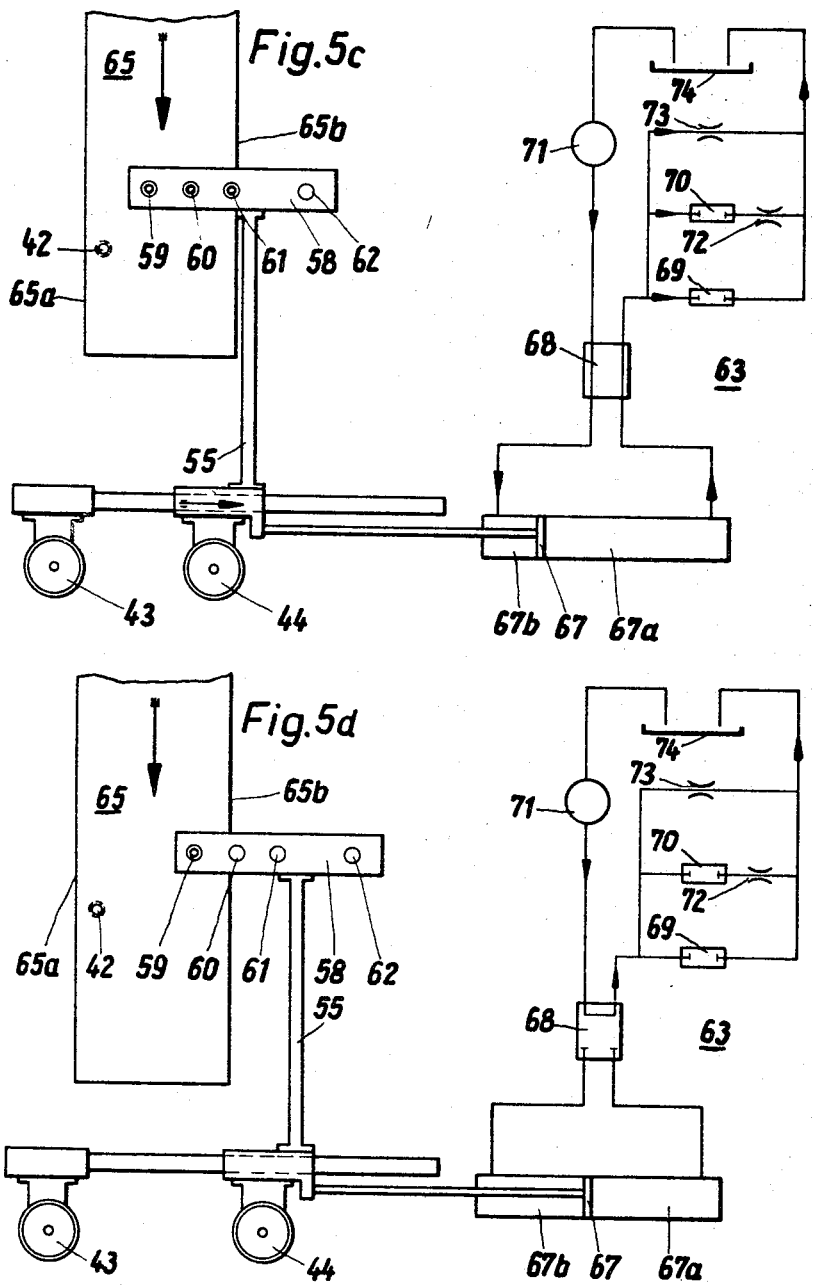

United States Patent Office 3,412,768
Patented Nov. 26, 1968

3,412,768
DEVICE FOR MACHINING THE LONGITUDINAL
EDGES OF PLATE-SHAPED WORKPIECES OF
DIFFERENT WIDTHS
Helmut Torwegge, 18 Koblenzer Strasse,
Bad Oeynhausen, Germany
Filed Dec. 29, 1965, Ser. No. 517,358
10 Claims. (Cl. 144—114)

ABSTRACT OF THE DISCLOSURE

A device including a transversely movable tool for machining the longitudinal edges of plate-shaped workpieces of different widths including in combination a transversely movable optical means that automatically senses the width of a workpiece being fitted into the machining device. The machining device further includes means operably connecting the sensing device to the movable tool for the purpose of moving the tool in synchronism with the sensing device as it moves transversely of the workpiece feeding direction. In this way, the position of the tool is automatically adjusted to the narrowest width of the workpiece being machined.

BACKGROUND OF THE INVENTION

This invention relates to a device by which the lateral or longitudinal edges of workpieces of different widths, particularly plate-shaped workpieces of wood or the like, preferably veneers, can be machined.

For shooting or smoothing the edges of veneers it is generally known to form stacks thereof which are straightened by shaking and jolting. The aligned stacks of veneer thus obtained are compressed by means of a press beam and machined on one side by means of a smoothing tool.

The jointing machines used for this operation produce a relatively large amount of chips and shavings and, moreover, it cannot be ensured that the veneers smoothed or straight-cut by them are perfectly parallel.

As to plate-shaped workpieces moving over a feeding path, it is also known to machine such workpieces by means of pivotable tools moved by springs or hydraulic means and adjusted to a uniform width of the workpiece. In the case of workpieces having different widths, these machines, too, have the disadvantage of involving heavy material losses through large amounts of chips or shavings.

The object of the invention is to provide a device of the initially specified type in which the disadvantages of the known machines are obviated and which permits workpieces of different widths automatically to be machined to different widths either on one side only or on two sides simultaneously.

According to the present invention, this object is attained in a device for machining the longitudinal edges of plate-shaped workpieces of different widths, particularly veneers, by means of tools, such as milling cutters, saws, planers and the like, adjustable to the widths of the workpieces, wherein the tool is connected with an optical (photoelectric) sensing device arranged to move in synchronism with said tool transversely of the workpiece feeding direction, thereby to sense the width of a workpiece being fed and correspondingly control the adjustment of said tool.

In a preferred embodiment of the invention, the sensing device comprises a plurality of photocells (photodiodes) known per se which are disposed in spaced relationship one behind the other in the direction of movement of the sensing device, the photocells acting as pulse generators and being connected through electric amplifier means to an adjusting device for the tool and the sensing device itself.

For accurately machining workpieces of different widths fed in rapid succession it will be convenient to provide at least one control means, such as a photocell or the like, on the workpiece feeding path for controlling the movement of said workpiece and the movement of said sensing device.

Such a device is capable of automatically sensing the width of each individual workpiece and to control accordingly the adjustment of one or more tools for machining the longitudinal edges of the workpiece. Thus it is possible to adjust the tools to the smallest width of a workpiece being of irregular width.

The invention has considerable advantages especially for machines used for smoothing or straight-cutting the edges of veneers since, on the one hand, it improves their output with respect to that of the known jointing machines and, on the other hand, it involves a remarkable cut in personnel because for manually operating the machine there is required one person only, who may also be dispensed with when the workpieces are fed automatically.

Brief description of the drawings

An embodiment of the invention will now be described by way of example and with reference to the accompanying drawings, in which:

FIGS. 4a to 4d are schematical representations of the individual phases of a lateral widening (right-hand traverse) adjustment of a tool of the machine, and FIGS. 5a to 5d are schematical representations of the individual phases of a lateral narrowing (left-hand traverse) adjustment of the same tool.

Description of a specific embodiment

Figure 1:
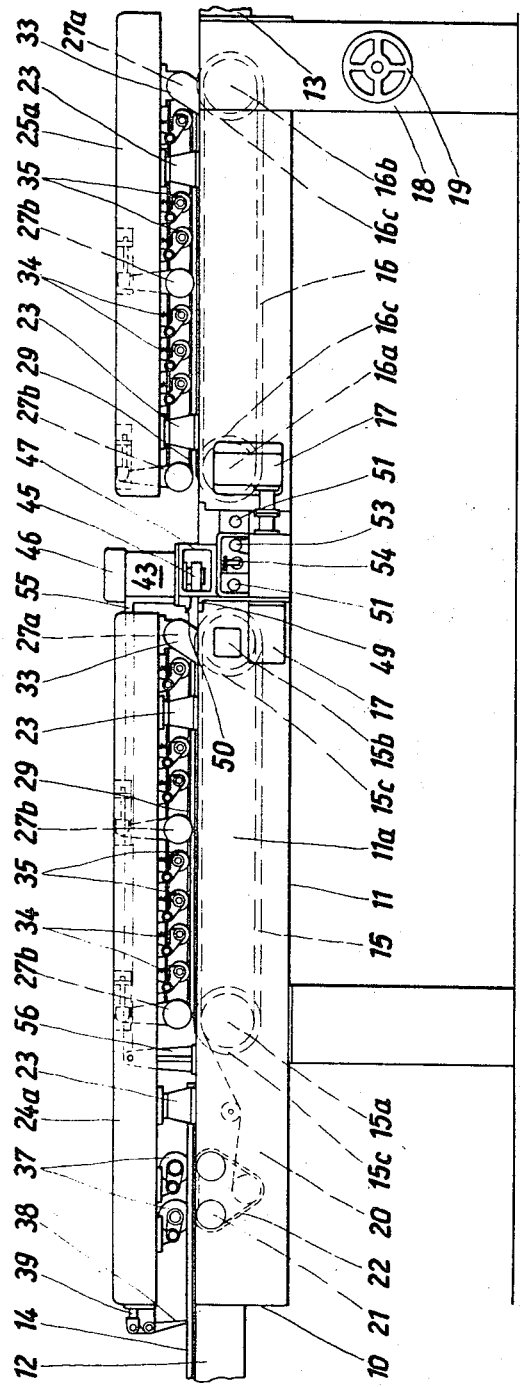
FIG. 1 is a side elevational view of a jointing machine.
Figure 2:
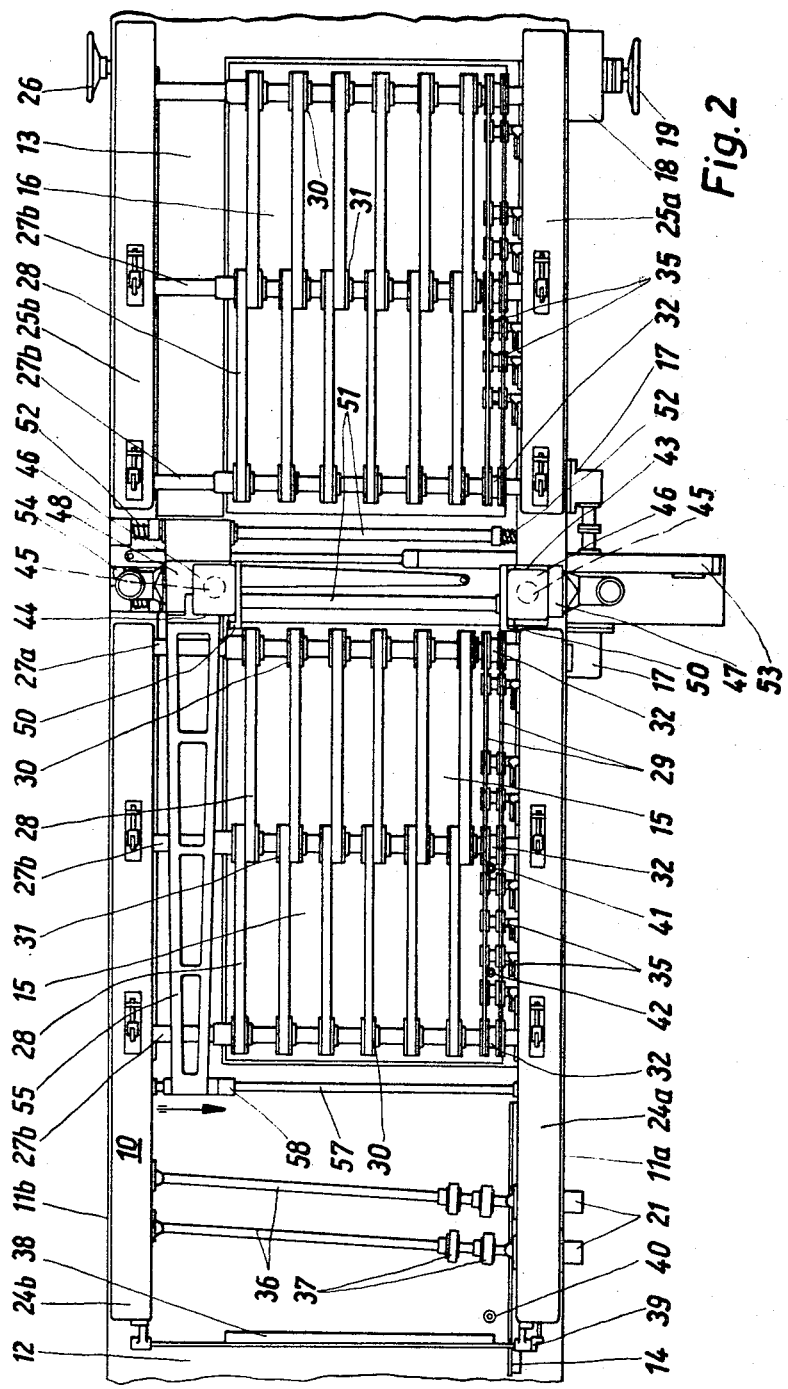
FIG. 2 is a top plan view of the machine.

FIGS. 1 and 2 show a jointing machine 10 for smoothing or straight-cutting the edges of veneers, boards or the like which comprises a machine frame 11 formed of two cheeks 11a and 11b which are connected with each other by means of cross girders and shafts. At either end of the jointing machine 10 there is provided a working plate 12 or 13, respectively. Expediently, the working plates 12 and 13 project into the jointing machine 10, and a guide rail (back square) 14 is fixed to one of the longitudinal sides of the working plate 12.

Two belt conveyors 15 and 16 are arranged between the two cheeks 11a and 11b and below the upper edges thereof one behind the other, for moving the workpieces to be machined. The two belt conveyors 15 and 16 are operated in synchronism and are each formed, for example, by two chains interconnected by crosswise arranged strips or the like of synthetic plastic material. The belt conveyors 15 and 16 are each guided in an endless loop around chain wheels 15c and 16c respectively, fixed on spaced shafts 15a, 15b and 16a, 16b, respectively, sliding with their strip ends on guide rails (not shown), and are preferably driven by an electric motor through an infinitely variable speed transmission incorporated in a column 18 of the machine frame 11, from where the power is transmitted through a chain drive or the like (not shown) to the rear shaft 16b of the belt conveyor 16. To obtain synchronized operation, the two belt conveyors 15 and 16 are connected through a synchromesh transmission 17. The transmission ratio of the infinitely variable speed transmission can be adjusted by turning a hand wheel 19 provided on the column 18.

Through a chain drive 20 or the like the conveyor motion is synchronously transmitted, for example, from the shaft 15a of the conveyor 15 to a chain drive 22 or the like for driving a pair of preferably oblique (FIG. 2) feed rollers 21 disposed ahead of the conveyor 15.

Above the frame cheeks 11a and 11b longitudinal beams 24a, 24b, 25a and 25b are arranged, each of which is supported by two spindles 23 interconnected by means of shafts and gears (not shown) so as to be synchronously adjustable in height through a chain drive or the like (not shown) operable by means of a hand wheel 26. To enable the spindles 23 to be rapidly moved up in the case of a trouble in one of the conveyors, caused by the workpiece or the like, an auxiliary motor (not shown) is provided.

Shafts 27a and 27b mounted below the longitudinal beams 24a, 24b, 25a and 25b are provided, in the region of the conveyors 15 and 16, with a plurality of conveyor rollers 30, 31 and 32 (FIG. 2) in side-by-side arrangement for driving flat belts 28 holding a workpiece over its whole width down on the conveyors 15 and 16, and V-belts 29. The shafts 27a are driven by the conveyor shafts 15b and 16b through respective gearings 33 and arranged to drive upper flat belts 28 and V-belts 29 in synchronism with the lower conveyors 15 and 16. The V-belts 29 are arranged on the side of the guide rail 14 and serve to carry along a workpiece. The V-belts 29 are urged against the conveyors 15 and 16 by means of rollers 35 held down by compression springs 34 (FIG. 1).

Rolling with each one of the pair of oblique feed rollers 21 mounted in the bed 11 are, for example, two pressure rollers 37 which are mounted on likewise oblique shafts 36 and disposed adjacent the guide rail 14 (see FIG. 1). Due to the obliquity of the feed rollers 21 and the pressure rollers 37 a workpiece fed into the jointing machine will be drawn against the guide rail 14.

The longitudinal beams 24a, 24b are provided with a self-locking blocking means 38 secured to their front end faces, which in its locked position engages with its lower edge the working plate 12. The blocking means 38 has an associated pneumatic, hydraulic or the like pressure medium operated adjusting device 39 which is controlled by photoelectric cells 40 and 41 mounted in series (cf. FIGS. 3a through 3d). Between the photoelectric cells 40 and 41 there is arranged a photoelectric cell 42 for actuating a photoelectric sensing device 58. The photocells 41 and 42 are longitudinally adjustable in the feeding direction of the workpieces to be machined.

In this embodiment the jointing machine 10 is provided in its central zone, i.e. following the conveyor 15 with respect to the feeding direction, with two lateral milling attachments 43 and 44 (FIG. 2), each of which is provided with a vertically disposed cutter 45 directly mounted on the shaft of a high-speed electric motor 46 or the like. The motors 46 are bolted to a frame-like casing 47 and 48 respectively, from which the resulting chips are sucked off by known suction means. The two cutters 45 are laterally adjustable to the required chip section and settable in the adjusted positions. To increase the tool life between two successive sharpening operations, the cutters 45 are shiftable in axial direction.

For guiding a workpiece past the cutters 45, the casings 47 and 48 are each provided with an upper guide bar 50 and a lower guide bar 49. The upper guide bars 50 are resiliently mounted and can be adjusted to the respective thickness of the workpiece, to ensure perfect guidance.

Whereas the casing 47 of the milling attachment 43 is stationary, the opposite milling attachment 44 with its casing 48 is preferably laterally displaceable on two spaced parallel cylindrical guide rails 51 mounted in the machine frame 11. The guide rails 51 carry at either end a pushed on compression spring 52 to avoid hard bounces of the casing 48 in the extreme positions of its range of movement.

The casing 48 of the movable milling attachment 44 can be displaced, for example, by two oppositely arranged single-acting pressure cylinders 53, 54 (in FIGS. 3 and 4 illustrated as double-acting pistons). A connecting arm 55 fixed at one end to the casing 48 is mounted at its other end on a transverse guide rail 57 for parallel displacement. The guide rail 57 is mounted in two bearing brackets 56 fixed to the machine frame 11. On the underside of its end supported by the transverse guide rail 57 the connecting arm 55 carries the above-mentioned photoelectric sensing device 58 provided, for example, with four photodiodes 59, 60, 61 and 62 arranged in series in axial direction (direction of travel) and inclined toward the workpiece to be machined. The photodiodes 59, 60, 61 and 62 are adapted to control the lateral displacement of the milling attachment 44 by actuating, i.e. opening and/or closing, through their pulses a plurality of valves in a pressure medium system 63 operating the pressure cylinders 53, 54.

The diode 61 determines the direction of the lateral displacement, depending on its exposure or darkening, whereas the diodes 59, 60 and 62 have the function of selecting the speeds—preferably three, viz. rapid traverse, slow traverse, extra slow traverse—of this displacement.

It is well within the scope of the present invention to effect the parallel movement of the photoelectric sensing device also by other mechanical means, such as a chain drive, a cable control, rods or the like. It is further advantageous to arrange gluing means 64 directly behind the cutters 45, for applying glue to the machined edges. The gluing means preferably comprise a glue nozzle from which glue comes forth under pressure only when a workpiece is passing. But the application of glue may also be effected by another device, such as a gluing roller or the like.

The above-described jointing machine 10 for the jointing of veneers, boards or the like operates as follows:

A workpiece 65 of any length positioned on the working plate 12 (feed table) is pushed through the opened blocking device 38 and along the stationary guide rail 14 into the jointing machine 10 (see FIG. 3a) until it is engaged by the first one of the pair of feed rollers 21 and by the associated pressure rollers 37 rolling thereon and, while being urged at the same time against the guide rail 14 due to the oblique arrangement of the feed rollers 21 and the pressure rollers 37, fed to the forward conveyor 15. The workpiece 65 supported on the belt conveyor 15 and guided by the guide rail 14 is carried along and guided by the V-belts 29 which are urged against the upper side of the conveyor 15 by means of the spring-loaded rollers 35. At the same time, the flat belts 28 press the workpiece 65 over its whole length on the belt conveyor 15.

As soon as the leading edge of the workpiece 65 passes over the photocell 42 (FIG. 3b), this latter actuates the photoelectric sensing device 58 and initiates the adjustment of the milling attachment 44 to the narrowest width of the workpiece 65 to be machined.

Figure 3A:
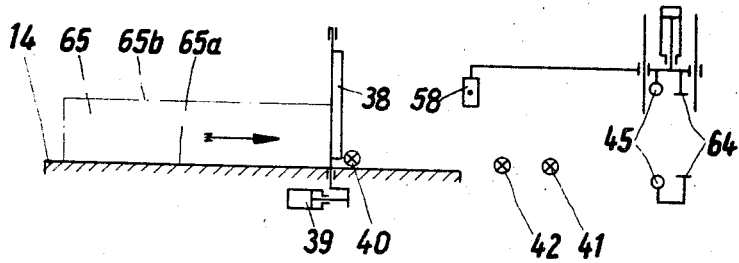
FIGS. 3a to 3d are schematical representations of the sequence of operations carried out by the machine.
Figure 3B:
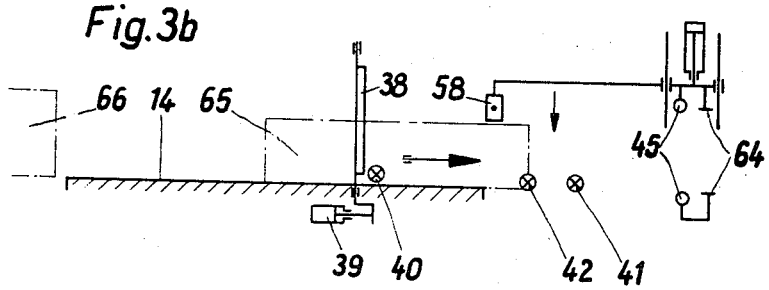
Figure 3C:
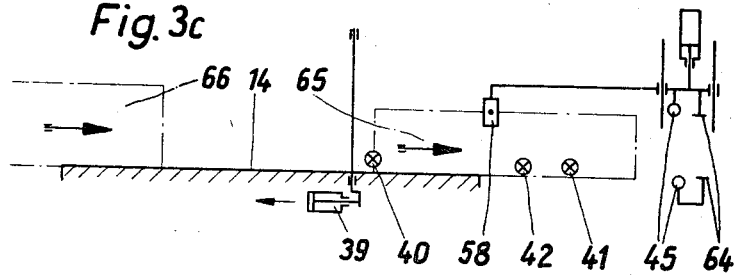
Figure 3D:
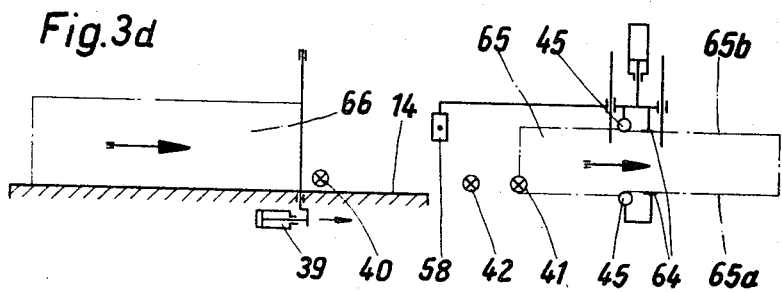

When the trailing end of the workpiece 65 has passed the photocell 40 disposed immediately behind the blocking device 38 in the feeding direction, this photocell 40 actuates the pressure medium operated adjusting device 39 which closes the blocking device 38 and thus prevents a following workpiece 66 from being prematurely introduced in the jointing machine (FIG. 3c).

In the region of the milling attachments 43 and 44 the workpiece 65 conveyed by the belt conveyor 15 is guided by the guide bars 49 and 50 while its edges 65a and 65b are being machined. The belt conveyor 16 following the belt conveyor 15 on the downstream side thereof engages the machined workpiece 65 and conveys it to the working plate 13 (delivery table).

As the photocell 41 is cleared by the trailing edge of the workpiece 65 it causes the blocking device 38 to be opened by the adjusting device 39 (FIG. 3d) so that the following workpiece 66 can be fed into the jointing machine 10.

When the photocell 42 is concealed by a workpiece 65 moved on the conveyor 15, it actuates the diodes 59, 60, 61 and 62 arranged on behind the other in the photoelectric sensing device 58 transversely of the feeding direction of the workpiece. First, the diode 61 actuates the pressure medium system 63 to move the milling attachment 44 by means of the pressure pistons 53 and 54 either to the left (toward the guide rail 14) or to the right, depending on the exposure or darkening of the diode 61 by the workpiece passing adjacent or directly below the photoelectric sensing device 58, whereas the diodes 59, 60 and 62 select and control the speed at which such movement is to be effected.

FIGS. 4a to 4d illustrate by way of schematically simplified circuit diagrams the individual phases of a right-hand displacement, the two single-acting cylinders 53 and 54 (FIGS. 1 and 2) having been replaced, for the sake of simplicity, by a double-acting piston 67. When the workpiece 65 passing below the photoelectric sensing device 58 darkens the diode 61, this latter actuates a four-way valve 68 of the pressure medium system 63 so that two two-way valves 69 and 70 are opened to allow a large return flow of the pressure medium from a pressure cylinder chamber 67a. At the same time an oil pump 71 fills a pressure cylinder chamber 67b thereby to move the piston 67, which is connected with the milling attachment 44, at the highest possible speed, i.e. rapid traverse to the right (FIG. 4a).

On the downstream side of the four-way valve 68 the returning pressure medium is conducted, on the one hand, through the two-way valves 69, 70 and a rear-position control valve 72 (slow speed) and, on the other hand, through a control valve 73 (extra slow speed) to a reservoir 74.

As soon as the diode 62 is exposed to light, it closes the two-way valve 69. In this manner the pressure medium flow is reduced so that the milling attachment with the piston 67 moves at slow speed to the right (FIG. 4b) until the diode 61, too, is exposed to light and closes also the two-way valve 70, whereby the pressure medium return flow is reduced once more. The pressure medium returns only through the extra slow traverse control valve 73 to the reservoir 74. The milling attachment thus is moved by extra slow traverse to the right (FIG. 4c), tracing the edge 65b, until the diode 60 is also exposed to light, thereby to shut off the supply and return flow through the four-way valve 68 (FIG. 4d). The photoelectric sensing device 58 now has been adjusted to the edge 65b of the workpiece and will remain in this position together with the movable milling attachment 44.

FIGS. 5a to 5d show an adjusting operation to the left. In this case, the workpiece 65 moves by the side of the photoelectric cell 58. The diode 61 is exposed to light and controls the four-way valve 68 so that the milling attachment 44 moves to the left. The two-way valves 69 and 70 are open and thus render possible rapid traverse. The pressure medium coming from the pressure cylinder chamber 67b flows through the four-way valve 68 to the reservoir 74 (FIG. 5a).

When the diode 59 is darkened, the two-way valve 69 closes (FIG. 5b). The milling attachment 44 moves at slow speed to the left until the diode 61 too is darkened—in the case of left-hand traverse the diode 60 is overrun without change-over—which then effects the change-over of the four-way valve 68 to right-hand traverse (see FIG. 5c and cf. FIG. 4c) and closes the two-way valve 70. The milling attachment 44 now moves at extra slow speed to the left until the diode 60 is exposed to light again and stops the adjusting operation in the manner described with reference to FIG. 4d (cf. FIG. 5d). By overrunning the diode 60 and reversing the direction of movement by the diode 61 the milling attachment is accurately arrested and adjusted at the end of its traverse.

After completion of the adjustment, if the diodes 59, 60, 61 and 62 are re-exposed to light, this cannot initiate another adjustment because to that end it is required that the photocell 42 be first exposed and then darkened again.

From the foregoing it will be appreciated that a jointing machine incorporating the present invention, i.e. in which the traverse of one of two milling attachments is controlled by a photoelectrical sensing device optically sensing the edges of a workpiece to be machined, is simple, rapid and economical, in operation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. In a device including a transversely movable tool for machining the longitudinal edges of plate-shaped workpieces of different widths, in combination therewith:
   (a) a transversely movable optical means sensing the width of a workpiece being fed into said machining device, and
   (b) means operably connecting said sensing means to said tool to move said tool in synchronism with said sensing device transversely of the workpiece feeding direction thereby adjusting the position of said tool to the width of said workpiece.

2. A device as claimed in claim 1, wherein said sensing means comprises a plurality of photocells disposed in spaced relationship one behind the other in the direction of movement of said sensing means and acting as pulse generators, and an electric amplifier means connecting said photocells to a means for adjusting said tool and said sensing means.

3. A device as claimed in claim 1 wherein said optical means includes photocells operably connected to means adjusting the speed of said tool moving transversely of the workpiece feeding direction.

4. A device as claimed in claim 2, wherein part of said photocells are spaced equidistantly one behind the other.

5. A device as claimed in claim 2, wherein part of said photocells are irregularly spaced one behind the other.

6. A device as claimed in claim 1, wherein said sensing means is rigidly connected with said movable tool.

7. A device as claimed in claim 2, wherein said adjusting means comprises a pressure medium operated single or double-acting piston.

8. A device as claimed in claim 7, including means connecting said sensing means to valves controlling a pressure medium circuit of said pressure medium operated piston.

9. A device as claimed in claim 1, wherein at least one control means is provided on the workpiece feeding path for controlling the movement of said workpiece and the movement of said sensing device.

10. A device as claimed in claim 1, wherein a blocking device for a following workpiece is provided and a photocell control means is located in the workpiece feeding path and controls said blocking device.

References Cited

UNITED STATES PATENTS

| | | | |
|---|---|---|---|
| 2,747,666 | 5/1956 | Brooks | 83—364 |
| 3,036,483 | 5/1962 | Porter | 83—368 XR |
| 3,068,915 | 12/1962 | Arnett | 144—2 |
| 3,120,861 | 2/1964 | Finlay et al. | 144—2 |
| 3,165,961 | 1/1965 | Hammond | 144—2 XR |

WILLIAM W. DYER, JR., *Primary Examiner.*

W. D. BRAY, *Assistant Examiner.*